ASSOCIATIVE MEMORY MATCH INDICATOR CONTROL

Filed April 2, 1962

INVENTOR
FLOYD A. BEHNKE
BY George Baum
ATTORNEY

ASSOCIATIVE MEMORY MATCH INDICATOR CONTROL

Filed April 2, 1962

2 Sheets-Sheet 2

3,195,109
Patented July 13, 1965

3,195,109

ASSOCIATIVE MEMORY MATCH INDICATOR CONTROL

Floyd A. Behnke, Ruby, N.Y., assignor to International Business Machines Corporation, New York, N.Y., a corporation of New York Filed Apr. 2, 1962, Ser. No. 184,329
5 Claims. (Cl. 340—172.5)

This invention relates to associative memory circuits in general, and more particularly to matching circuits employed with such memory circuits.

In a copending application by applicant entitled "Associative Memory Logical Connectives," Serial No. 161,491, filed December 22, 1961, and assigned to the same assignee as applicant's assignee, there is shown and described a logical connective system employing cryotrons, such system permitting the selection of either an AND or OR register so that one can obtain multi-field selection involving the AND function or multi-field selection involving the OR function. As was noted in such copending application, words in memory are divided into a number of fields and each field may have any number of bit positions. A multi-field search is obtained by making a simultaneous comparison of all the words in memory with the words appearing in an interrogation register. The compared words may be higher than, lower than, or equal to the interrogation register word. The AND/OR logic is chosen prior to the performance of a simultaneous multi-field association so that the output obtained from such association would indicate whether fields have been ANDed or ORed.

Assuming, solely for purposes of explaining the invention, that there are four fields of interest, A, B, C and D in each word in memory. A simultaneously multi-field association can be performed wherein the interrogation register is filled with a logical statement including all the fields. Suitable masking means are employed to limit the fields of interest in such association. Logical connectives between fields are actuated so that one may compare either the ANDed or the ORed fields in each word of a memory with the logical statement in the interrogation register. In performing the multi-field association, one may be searching at any given time for words in memory that are either higher than, less than, or equal to the logical statement in the interrogation register. When the search is being made, indicating or matching circuits (or bits) are actuated for those words in memory which conform to the logical statement being sought. Normally a matching circuit associated with a given word in memory is in its OFF state and is switched to its ON state when such given word is matched with the logical statement in the interrogation register.

For some techniques requiring multiple sequential operations of an associative memory, it is desirable to have control over the conditioning of the match indicator bits. That is, in some instances it is useful to preset all match indicator bits to the ON state prior to a multi-field association and then switch a bit to its OFF state when a match condition does not exist, and in other instances it is desirable to preset all match indicator bits to their OFF states and then switch all indicator bits representing matched words to their respective ON states.

Assume that each word consists of four fields and it is desired to select those words in storage in which field A and field D or field B and field C are greater than or equal to comparable fields in the interrogation register. Fields A and D will be interrogated in one operation with the AND condition selected. The match indicators for those storage words that qualify are turned "on" implying that all match indicators were off prior to the operation. In a second operation, before which the match indicators are permitted to remain in the condition resulting from the first operation, fields B and C are interrogated. The appropriate match indicators are turned "on." In this manner, match indicators are "on" for all words that meet the specified criteria that A and D or B and C compare favorably with the interrogation register to be selected.

Now, if the expression is in the OR-to-AND form, the operation must be performed differently. Consider the example that a storage word matches if A is greater than or equal to $A^1$ in the interrogation register (IR) or D is greater than or equal to $D^1$ in the IR and B is greater than or equal to $B^1$ in the IR or C is greater than or equal to $C^1$ in the IR, that is:

$$A \geqslant A^1 \text{ OR } D \geqslant D^1 \text{ AND } B \geqslant B^1 \text{ OR } C \geqslant C^1$$

or in another form $$(A \geqslant A^1 + D \geqslant D^1)(B \geqslant B^1 + C \geqslant D^1)$$

In this case all match indicators are turned "on" prior to the first of two operations. Fields A and D are interrogated to determine whether any word in storage qualifies this far. The match indicators of those that do not qualify are turned off. The match indicators remaining on designate those words that satisfy the partial criteria. The fields B and C are then interrogated and the match indicators of those words that do not qualify are turned off. The match indicator remaining on after the second operation indicate those words in storage that satisfy the complete criteria specified.

Thus, it is seen that many logical criteria may be more quickly searched for employing associative memory techniques if one were able to control the manner in which matching bits are conditioned prior to the performance of a multi-field search. This invention increases the versatility of simultaneous multi-field searches by using control logic to condition all match indicating circuits before sequential operations of an associative memory are performed so that one may exercise the option of causing mismatches obtained during such operations to either turn an indicator bit ON or OFF.

Accordingly, it is an object to improve the overall versatility of an associative memory.

It is a further object to provide control of match indicator circuits in an associative memory.

It is yet another object to provide logical control of match indicator circuits as an aid in expediting the performance of multiple interrogation operations in an associative memory system.

The foregoing and other objects, features and advantages of the invention will be apparent from the following more particular description of preferred embodiments of the invention, as illustrated in the accompanying drawings.

Figures 1, 2:
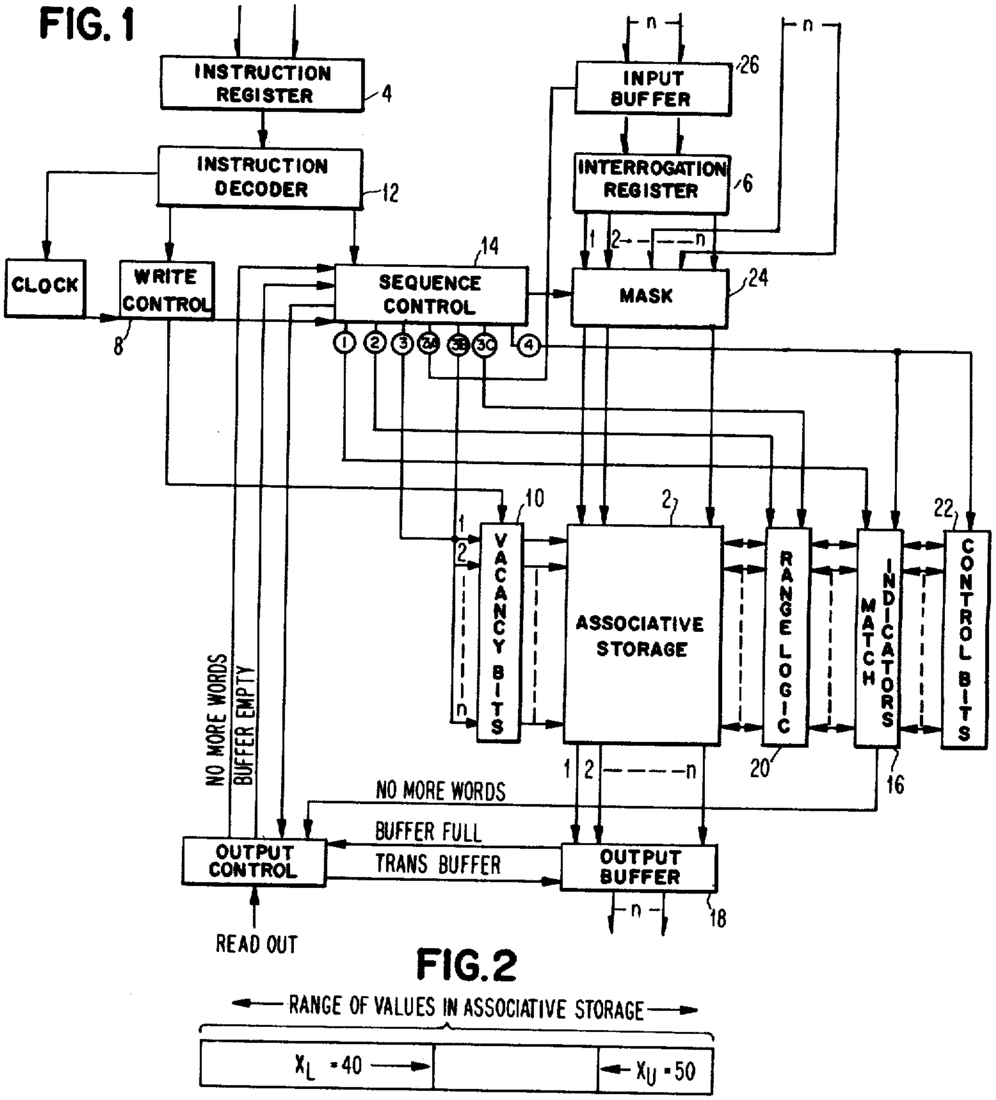
FIG. 1 is a schematic of the Range-Logic organization of an associative memory multi-search system.
FIGS. 2, 3 and 4 are a symbolic representation of the actuation of match indicators during a range retrieval operation employing a search system similar to that shown in FIG. 1.

FIG. 1 broadly sets out a multi-search readout organization seeking an exact match between the contents of an interrogation register and the words in an associative storage. Writing into an associative storage memory 2 is accomplished by loading an instruction register 4 with the proper instruction and an interrogation register 6 with the word to be written into memory. When the instruction register 4 as well as the interrogation register 6 have both been loaded, a signal is sent to the write-control circuitry 8 and vacancy bit positions 10 corresponding to the physical location of each word in storage 2 are scanned for the first empty register. The word in the interrogation register 6 is written into the selected storage location, and the corresponding vacancy bit is set to indicate occupancy of such selected storage location.

Sensing for an identical match in the associative storage 2 to a sample word in the interrogation register 6 takes place as follows: The instruction register 4 and the interrogation register 6 are loaded by a single instruction from a computer (not shown) or some other external piece of equipment. The instruction is decoded by instruction decoder 12 and commands are initiated under the control of sequence control circuitry 14. Compare circuits incorporated in the associative storage 2 compare the bits of its words with corresponding bits in the interrogation register 6. When a match occurs, a match indicator bit within the group of match indicators 16 and associated with such matched word will be set to its ON state. Such match indicators are transmitted to an output buffer 18 and the latter is sampled by the computer to determine whether a value equal to the interrogation word exists in storage.

Where retrieval is sought of those words in storage 2 that lie between a range of values, range logic circuitry 20 and control bits 22 are added. Assuming that bit positions 30 through 36 of each word in storage 2 contain the age of each person and it is desired to select personnel who are older than forty years of age. The mask register 24 is loaded with a word that masks out all bit positions except 30 through 36 and the interrogation register 6 is loaded with the number 40 in bits 30 through 36 and the "greater-than" logic is selected. Sequence control 14 controls the following operations. First, all the match indicator bits 16 are set to ON and the compare operation is initiated. The match-indicator bits 16 of all words equal to or greater than the sample word in the interrogation register 6 will remain ON. Whenever a memory register word is less than the word in the interrogation register 6, the corresponding match indicator 16 bit will be turned OFF. Selection of memory words less than the value in the interrogation register 6 is carried out in the same manner using "less-than" range logic.

To select memory words or values falling between two limits, for example, all persons between the ages of 40 and 50, the lower limit is loaded into the interrogation register 6 and the upper limit into input buffer register 26. In response to the initial compare instruction which selects "greater-than" logic, sequence control logic 14 begins its sequence of operations to obtain values of words greater than 40. Once the greater values (over 40) have been selected and the "less-than" match indicator bits 16 have been turned off, interrogation register 6 is cleared and the content of input buffer register 26 is transferred to interrogation register 6, the latter now containing the upper limit 50. A second compare instruction is initiated and the "less-than" logic is selected. Now all mismatches, which will of course be greater than the sample word, will turn off additional match indicator bits 16. The only indicators left ON are those whose values fall between the prescribed limits 40 to 50.

Figure 3:
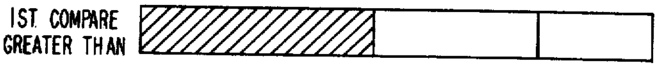
Figure 4:
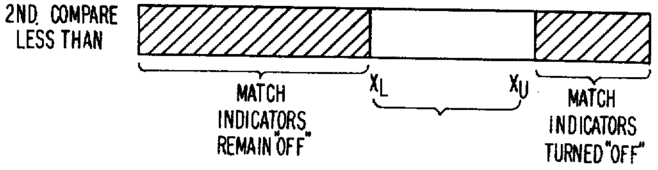

FIG. 2 shows the condition (all ON) of the match indicator bits 16 before a range retrieval of words has begun. After the first compare instruction seeking words in memory 2 that are greater than the content of the interrogation register 6, all match indicator bits 16 corresponding to memory words that are less than the lower limit are turned OFF. This condition is shown in FIG. 3. When the second compare instruction (greater than) has been carried out with the upper limit of the range sought placed in the interrogation register 6, all match indicator bits corresponding to memory words greater than 50 will be turned OFF as shown in FIG. 4. Those match indicator bits remaining ON correspond to those memory words that lie in the range between 40 and 50.

Figure 5:
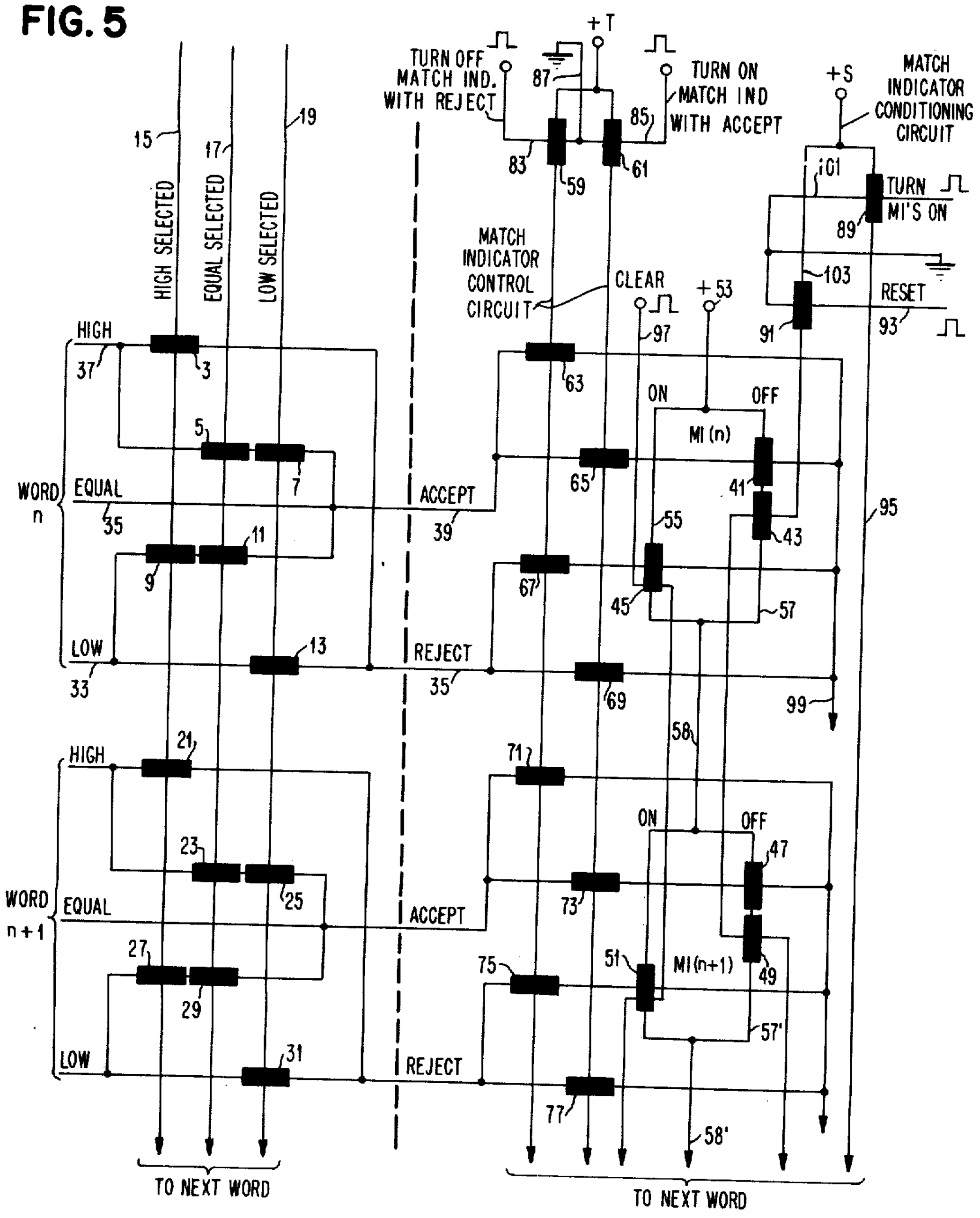
FIG. 5 is a showing of the match indicator control logic employed in the practice of the invention.

The foregoing has illustrated certain conditions requiring multiple sequential operations of an associative memory wherein it was shown to be advantageous to have control over the conditioning of the match indicator bits 16 corresponding to the words in storage 2. FIG. 5 sets forth such match indicator conditioning circuit for exercising such control, the embodiment chosen to illustrate the invention relying upon cryogenic devices.

To the left of the dotted line of FIG. 5 are shown the positions of two partial words $n$ and $n+1$, and such positions represent range selection logic. It is shown mainly to indicate how "accept" or "reject" currents are formed. The last bit of word $n$ or the last bit of a field of a word $n$ would comprise cryogenic gates 3, 5, 7, 9, 11 and 13 with line 15 serving as a control line for gates 3 and 9, line 17 is a control line for gates 5 and 11 and control line 19 serving as control line for gates 7 and 13. Such control lines continue throughout memory 2 and their currents control similar gate cryotrons corresponding to the same order bit of different words, such as cryotrons 21, 23, 25, 27, 29 and 31 of word $n+1$. Compare current proceeds from the left to the right through each word in memory 2. As was set forth in applicant's copending application for "Associative Memory Logical Connectives," filed on December 22, 1961, and having the Serial No. 161,491, such compare current searches out each bit position of a word in memory to determine how such bit position corresponds to its corresponding unmasked bit position in the interrogation register 6.

Assume that the search calls for those words in memory 2 that are equal to or greater than the word in the interrogation register 6. For such search, current will appear on line 15 to indicate that the greater than or high range has been selected. Consequently, cryotrons 3, 9, 21, 27, etc. of the range logic in each word in memory 2 will be resistive and th remaining cryotrons such as 5, 7, 11, 13, 23, etc. will remain in their respective superconductive states. If the word, such as word $n$, to the left of the range logic shown in FIG. 2 were less than its corresponding word in the interrogation register 6, compare current would appear on LOW line 33, and since cryotron 9 is resistive (current on HIGH line 15) and cryotron 13 superconductive, the compare current will appear on REJECT line 35. If all previous comparisons of bit positions to the left of the positions shown in FIG. 2 were equal to or greater than corresponding bit positions in the interrogation register 6, compare current would appear either on EQUAL line 35 or on HIGH line 37, and current on either line 35 or 37 will exit onto the ACCEPT line 39.

As was explained hereinabove, techniques requiring multiple sequential operations of an associative memory make it desirable to have mismatches turn OFF preset match indicators and at other times it is desirable to have matches turn ON match indicators which had been set previously to the OFF condition. The circuitry to the right of the dotted line in FIG. 2 performs the desired control of the match indicators 16 referred to in the block diagram of FIG. 1.

A match indicator bit, such as the bit associated with word *n*, will include cryotron gates 41, 43 and 45 and the match indicator bit associated with word *n*+1 will include cryotron gates 47, 49 and 51. When entire current from source 53 passes through line 55, the match indicator bit associated with word *n* is in the ON state whereas total current from source 53 passing through line 57 indicates that such match indicator bit is in the OFF state. The control circuit for the match indicator bits comprises cryotrons 59, 61, 63 . . . to 77 and control lines 79 and 81 associated therewith. Lines 83 and 85 and common return path 87 provide control lines for cryotrons 59 and 61. Cryotrons 89 and 91 are included in the conditioning circuits for the match indicator bit positions.

Operation of the match indicator control circuitry will now be described. Assume that it is desired to turn on match indicators MI(*n*) and MI (*n*+1) whenever a match occurs. Reset line 93 of the conditioning circuit is pulsed, driving cryotron 91 resistive, causing current from source +S to traverse path 95 through superconductive gate 89. The match indicator bits MI(*n*) and MI(*n*+1) are turned to their cleared or OFF states by sending current through path 97 to drive cryotrons 45 and 51 resistive, diverting current from source 53 to path 57, through connecting path 58 and path 57', connecting path 58', etc. Line 85 is pulsed to obtain the "Turn on Match Indicators With Accept" condition, current in line 85 to 87 and to ground causing cryotron 61 to be resistive. Current from source +T is now diverted through superconductive gate 59, through control line 79, driving cryotrons 63, 67, 71 and 75 to their respective resistive states. Thus, if current appears on an accept line 39 (indicating a match between a word in memory and the interrogation register), such current will traverse cryotron 65 because cryotron 63 is resistive, drive cryotron 41 resistive, and exit along line 99. With cryotron 41 now resistive, total current from source 53 is diverted along the left side, such as through line 55, effectively turning the MI(*n*) indicator ON. If word *n* did not match the content of the interrogation register, compare current would appear on reject line 35 and traverse gate cryotron 69, since cryotron 67 is resistive, and continue on to line 99. For such unmatched condition, match indicator bit MI(*n*) would remain in the OFF state.

Should it be desired to turn a match indicator bit to its OFF state when there is a mismatch, a current pulse is sent through line 83 to exit on line 87, making cryotron 59 resistive, diverting total current from input terminal T to line 81. As a consequence, all cryotrons, such as cryotrons 65, 69, 73, 77, etc., are made resistive. Prior to sending a current pulse along line 83, line 101 is pulsed to drive cryotron 89 resistive so that total current from source +S traverses line 103 to drive cryotrons 43, 49, etc. resistive, effectively turning all match indicator bits, MI(*n*), MI(*n*+1), etc. ON. Now when compare current appears on REJECT line 35 to indicate a mismatch, such compare current will go through gate cryotron 67 and make cryotron 45 resistive, resulting in total current from source 53 being diverted along line 57 to turn match indicator MI(*n*) to its OFF state.

The match indicator control logic described and shown herein permits a versatile use of match indicators. In one instance, multiple sequential operations of an associative memory is begun with all match indicator bits in their respective OFF states, in another instance such multiple operations are begun with all match indicator bits in their respective ON states. The selection of the initial state of an indicator bit is under control of a compare instruction which initiates such multiple sequential operations. While the use of the present invention has been shown in conjunction with a range retrieval problem, there are other problems solved by computers employing associative memory techniques that can benefit from such match indicator control circuitry, such as finding the nearest lower, nearest higher, or nearest value in an associative memory. It is understood that control elements other than cryotrons could be employed to practice this invention, but superconductive components were employed for illustrative purposes in that they can be made exceedingly small in size, such smallness in size being highly desirable in making associative memory systems.

What is claimed is:

1. In an information retrieval system employing a memory unit comprising a plurality of word registers,
an interrogation register,
means for performing a simultaneous multi-field comparison of the content of each of said word registers with the content of said interrogation register,
indicating means associated with each word in said memory unit for indicating whether each such individual word matches or does not match the content of the interrogation register,
and means for conditioning such indicating means prior to said multi-field comparison for turning on said indicating means in response to a match or for turning off said indicating means in response to a mismatch.

2. In an information retrieval system employing a memory unit comprising a plurality of word registers,
an interrogation register,
means for performing a simultaneous multi-field comparison of the content of each of said word registers with the content of said interrogation register,
indicating means associated with each word in said memory unit for indicating whether each such individual word matches or does not match the content of said interrogation register,
said indicating means including two current-carrying parallel paths, one path including a single cryotron element and the second path including two cryotron elements in series with each other.

3. The invention as defined in claim 2 including means for driving one of said two series-connected cryotrons to its resistive state prior to performing said multi-field comparison.

4. In an information retrieval system employing a memory unit comprising a plurality of word registers,
an interrogation register,
means for performing a simultaneous multi-field comparison of the content of each of said word registers with the content of said interrogation register,
indicating means associated with each word in said memory unit for indicating whether each such individual word matches or does not match the content of said interrogation register,
said indicating means including a first pair of current-carrying parallel paths, one path of said first pair including a single cryotron element and the second path of said first pair including two cryotron elements in series with each other, and
a second pair of current-carrying parallel paths arranged to control said single cryotron element and one of said two series cryotron elements respectively.

5. In an information retrieval system employing a memory unit comprising a plurality of word registers,
an interrogation register,
means for performing a simultaneous multi-field comparison of the content of each of said word registers with the content of said interrogating register,
indicating means associated with each word in said memory unit for indicating whether each such individual word matches or does not match the content of the interrogation register,
said indicating means including two superconducting current-carrying parallel paths, one path including a single cryotron element and the second path including two cryotron elements in series with each other, wherein superconducting current in the path containing the two cryotrons represents the OFF state of said indicating means and superconducting current in the path containing the single cryotron represents the ON state of said indicating means, means for driving one of said series-connected cryotrons to the resistive state so as to set said indicating means to its ON state, and means for conditioning said indicating means so as to turn said indicating means to or retain it in its ON state when there is a match or to turn said indicating means to its OFF state when there is a mismatch.

References Cited by the Examiner

UNITED STATES PATENTS

| | | | |
|---|---|---|---|
| 3,031,650 | 4/62 | Koerner | 340—174 |
| 3,108,256 | 10/63 | Bucholz et al. | 340—172.5 |

OTHER REFERENCES

Pages 106–121, 4/61, "A Magnetic Associative Memory," IBM Journal, Kiseda et al.

Pages 179–187, 12/60, "Associative Self-Sorting Memory," Proceedings of the Eastern Joint Computer Conference, Seeber.

MALCOLM A. MORRISON, *Primary Examiner.*